(12) United States Patent
West

(10) Patent No.: US 6,198,603 B1
(45) Date of Patent: *Mar. 6, 2001

(54) DEVICE FOR LOCKING AND UNLOCKING A DISC DRIVE ACTUATOR HAVING LOCKING ELEMENTS SEPARATE FROM UNLOCKING ELEMENTS

(75) Inventor: Terence Hayden West, Aptos, CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,757

(22) Filed: Feb. 17, 1998

Related U.S. Application Data

(60) Provisional application No. 60/042,091, filed on Mar. 28, 1997.

(51) Int. Cl.[7] ....................................... G11B 5/54
(52) U.S. Cl. .............................................. 360/256
(58) Field of Search ................... 360/105, 256, 360/256.6

(56) References Cited

U.S. PATENT DOCUMENTS 5,339,209 * 8/1994 Dion ...................................... 360/105
5,523,910 * 6/1996 Alten ..................................... 360/105

* cited by examiner

Primary Examiner—A. J. Heinz
(74) Attorney, Agent, or Firm—Derek J. Berger; Jonathan E. Olson; Shawn B. Dempster

(57) ABSTRACT

An improved locking system for securing the actuator of a disc drive at a park position. The locking system includes a rotatable lock mechanism that is normally biased to a lock position. When the actuator is moved to the park position, a cooperative lock feature on the moving portion of the actuator interacts with a pawl feature on the rotatable lock mechanism to momentarily overcome the biasing force. When the lock feature on the moving portion of the actuator moves beyond the pawl feature, the bias force acts to return the rotatable lock mechanism to its locked position with the pawl feature engaging a cooperative surface on the lock feature to lock the actuator at the park position against a lightly compressed compliant limit stop and to maintain the actuator at the park position in the presence of applied mechanical shocks. The locking system also includes a voice coil motor element, responsive to electronic control circuitry, which is used to controllably overcome the biasing force on the movable lock element and release the actuator for normal operational interaction with the discs.

9 Claims, 16 Drawing Sheets

DEVICE FOR LOCKING AND UNLOCKING A DISC DRIVE ACTUATOR HAVING LOCKING ELEMENTS SEPARATE FROM UNLOCKING ELEMENTS

CROSS REFERENCE TO RELATED APPLICATIONS

This application claims the benefit of United States Provisional Application No. 60/042,091, filed Mar. 28, 1997.

FIELD OF THE INVENTION

This invention relates generally to the field of hard disc drive data storage devices, and more particularly, but not by way of limitation, to an improved locking mechanism for securing the actuator of a disc drive data storage device at one extreme of its defined range of motion.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in a disc drive utilizing a voice coil actuator system is typically under the control of a closed loop servo system. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to cause a correction current of appropriate polarity and magnitude to be sent to the coil.

Disc drives of the current generation typically include power management logic that monitors the activity levels within the disc drive and dynamically removes and restores power to various portions of the disc drive to minimize the power drawn by the disc drive. Such power management is particularly significant in disc drives incorporated in laptop computers that operate from battery power, and thus have a finite amount of available electrical power.

One disc drive component that draws a significant amount of power is the spindle motor used to rotate the discs, and it has, therefore, become quite common to include a "standby" mode of disc drive operation that removes power to drive the spindle motor, typically in response to the occurrence of a pre-selected time interval without disc activity requests from the host computer system. Since the shutting down of the spindle motor results in a loss of the flying characteristics of the heads, it is common to "park" the heads at a location away from the data areas of the discs when the disc drive is placed into standby mode.

Similarly, it is common for disc drives to include in their native instruction sets a group of commands that allows the system user to place the disc drive into either a standby or shutdown mode. Such decisions would typically be made when the system user knows that no disc drive accesses will be made for a relatively long time interval, or when the user intends to turn off the entire system.

When power to the disc drive is lost, servo control of the current flow in the coil of the voice coil actuator is also terminated. In the absence of DC current flowing in the coil, the actuator is free to move in response to such disturbances as mechanical shock, air movement within the disc drive or mechanical bias applied to the actuator by the printed circuit cable (pcc) used to carry signals to the coil and to and from the heads mounted on the actuator. Since a power loss also means that the spindle motor will also cease to rotate the discs, the air bearing supporting the heads also begins to deteriorate and contact will be made between the heads and the discs. Because of this, it is common practice in the industry to monitor input power to the disc drive, and, at the detection of power loss, to drive the actuator to a park position and lock it there until power to the disc drive is restored.

It is also well known to use the back electromotive force (BEMF) generated by the inertia of the spinning discs and spindle motor components to generate the power to move the actuator to a park position, and the park position is typically selected to be at a location which places the heads closely adjacent the hub of the spindle motor. By parking the heads toward the inner diameter of the discs, the amount of power necessary to overcome the frictional drag of the heads on the discs at power-up is minimized.

An alternative approach to protecting the heads and discs when a disc drive is placed in standby mode or in the event of a power loss to the disc drive is to utilize a ramping system closely adjacent the outer diameter of the discs to remove the heads from engagement with the discs. The actuator is parked with the heads supported by the ramps and locked in this position until the drive is placed in active mode, restarted, or power to the disc drive is restored. The actuator is then unlocked, and the heads are loaded back into engagement with the discs onto an established air bearing. In disc drives utilizing such ramp loading and unloading systems, the heads and discs should never come into direct contact.

The principal requirements of an actuator lock mechanism are that it hold the actuator at the park position in the presence of a defined maximum specified amount of applied mechanical shock during the time interval when power is not applied, and that the locking mechanism be capable of releasing the actuator once the spindle motor is up to operational speed.

Many forms of locks and latches to hold the actuator at the park position have been used and are disclosed in the art. These include magnetic latches, solenoid-activated locks, shape-memory metal latches and aerodynamically activated latches. For a representative review of several prior art actuator locks and latches, the reader is directed to U.S. Pat. No. 5,612,842, issued Mar. 18, 1997, U.S. Pat. No. 5,581, 424, issued Dec. 3, 1996, U.S. Pat. No. 5,555,146, issued Sep. 10, 1996, U.S. Pat. No. 5,365,389, issued Dec. 15, 1994, U.S. Pat. No. 5,361,182, issued Dec. 1, 1994, U.S. Pat. No. 5,313,354, issued May 17, 1994, U.S. Pat. No. 5,262, 912, Dec. 16, 1993 and U.S. Pat. No. 5,231,556, issued Jul. 27, 1993, all assigned to the assignee of the present invention and all incorporated herein by reference.

In locking mechanisms used in association with ramps, it is also desirable that the unlocking of the actuator does not require any sudden large acceleration of the actuator, since only coarse servo control of the actuator exists before the heads are repositioned in cooperative engagement with the discs. It is well known in the industry that the heads must be loaded off the ramps and onto the air bearing above the discs at a relatively low speed, to ensure that the air bearing is not overcome, allowing the heads to contact the disc surfaces. Any such head/disc contact greatly increases the possibility of damage to the heads, the discs or both.

Clearly a need exists for a locking system to hold the actuator of a disc drive at a park position, and maintain the actuator at the park position in the presence of applied mechanical shock, and which releases the actuator in a controlled manner when the spindle motor is up to operational speed.

SUMMARY OF THE INVENTION

The present invention is an improved locking system for securing the actuator of a disc drive at a park position. The locking system includes a movable lock mechanism that is biased to a lock position. When the actuator is moved to the park position, a cooperative ramp feature on the moving portion of the actuator interacts with a pawl feature on the movable lock mechanism to momentarily overcome the biasing force. When the ramp feature on the moving portion of the actuator moves beyond the pawl feature, the bias force acts to return the rotatable lock mechanism to its locked position with the pawl feature engaging a cooperative surface on the ramp feature to lock the actuator at the park position against a lightly compressed compliant limit stop, and to maintain the actuator at the park position in the presence of applied mechanical shocks. The locking system also includes a voice coil motor element, responsive to electronic control circuitry, which is used to controllably overcome the biasing force on the movable lock element and release the actuator for normal operational interaction with the discs.

It is an object of the invention to provide a locking system for maintaining the actuator of a disc drive at a park position in the absence of power applied to the disc drive.

It is another object of the invention to provide a locking system for maintaining the actuator of a disc drive at a park position in the presence of applied mechanical shocks of a specified magnitude.

It is another object of the invention to provide a locking system for a disc drive actuator that permits a controlled release of the disc drive actuator in response to a sensed proper rotational speed of the spindle motor of the disc drive.

These and other objects, features and benefits of the invention can best be understood by a review of the following DETAILED DESCRIPTION OF THE INVENTION when read in conjunction with an examination of the accompanying drawings.

BRIEF DESCRIPTION OF THE DRAWINGS

FIGS. 3-1 and 3-2 are plan and elevation views, respectively, of a limit stop assembly which forms a portion of the locking system of the present invention.

FIGS. 4-1 and 4-2 are plan and elevation views, respectively, of a coil bobbin which forms a portion of the locking system of the present invention.

FIGS. 8-1 and 8-2 are plan and elevation views, respectively, of a coil support element which forms a portion of the locking system of the present invention.

FIGS. 9-1 and 9-2 are plan and elevation views, respectively, of a lock pawl and bias spring element which forms a portion of the locking system of the present invention.

FIGS. 10-1 and 10-2 are plan and elevation views, respectively, of various components which form a portion of the locking system of the present invention, showing their assembled relationships.

FIGS. 11-1, 11-2 and 11-3 are plan, elevation and side views, respectively, of a magnetic circuit subassembly which forms a portion of the locking system of the present invention.

FIGS. 12-1 and 12-2 are diagrammatic elevation views of the magnetic circuit subassembly of FIGS. 11-1 through 11-3 and the coil assembly of FIG. 5 showing their relative positions when the elements of the locking system of the present invention are in the locked and unlocked positions, respectively.

DETAILED DESCRIPTION OF THE INVENTION

Figure 1:
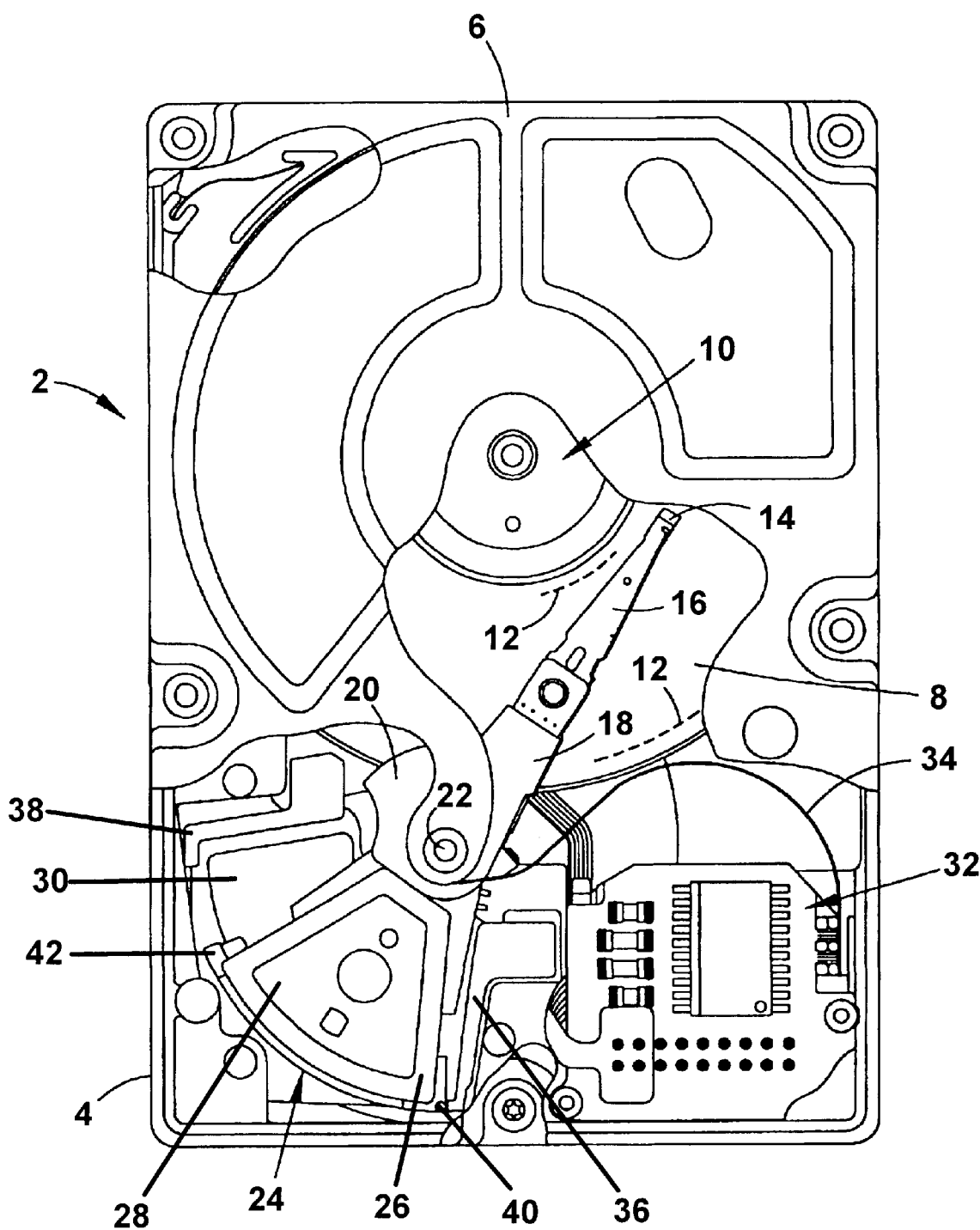
FIG. 1 is a top plan view of a prior art disc drive of the type in which the present invention is particularly useful.

Turning now to the drawings and specifically to FIG. 1, shown is a typical disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). the head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing, 20 in its rotation about the pivot shaft 22 is provided by a voice coil motor (VCM) shown generally at 24. The VCM 24 consists of a coil 26 formed around a bobbin 28 and supported by the actuator bearing housing 20 within the magnetic field of an array of permanent magnets, one of which is shown at 30, which are fixedly mounted to the base member 4, all in a manner well known in the industry. Electronic circuitry (partially shown at 32, generally, and partially carried on a printed circuit board (not shown)) to control all aspects of the operation of the disc drive 2 is provided, with control signals to drive the VCM 24 as well as data signals to and from the heads 14, carried between the electronic circuitry and the moving actuator assembly via a flexible printed circuit cable (PCC) 34.

The disc drive 2 also includes a prior art limit stop and actuator latching system consisting of an inner limit stop/latch 36, an outer limit stop 38 and, integrally molded onto the coil 26, inner and outer contact features 40, 42, respectively. The figure shows the actuator at its innermost position relative to the discs 8, with the inner limit stop/latch 36 contacting the inner contact feature 40. It will be apparent to one of skill in the art that, if the actuator were to be rotated about the pivot shaft 22 to its outermost position, with the heads 14 closely adjacent the outer diameter of the discs 8, the outer contact feature 42 would contact the outer limit stop 38. Thus the extremes of the range of motion of the actuator of the disc drive 2 are defined by the inner and outer limit stops 36, 38 in cooperation with the inner and outer contact features 40, 42 carried by the movable coil 26. Additional details of this prior art limit stop/latch system, including the manner in which compliance in the limit stops is achieved, can be found in previously incorporated U.S. Pat. No. 5,262,912, issued Nov. 16, 1993.

The prior art disc drive 2 of FIG. 1 is of the "contact start/stop" type which allow the heads 14 to actually contact the discs 8 when power is removed from the disc drive. In such disc drives, the heads 14 are typically parked and latched at the innermost extent of the actuator range of motion, as shown in FIG. 1, in order to minimize the torque required of the spindle motor to overcome the frictional forces between the heads 14 and discs 8.

Other disc drives prevent contact between the heads and discs by parking the heads on ramp structures when the disc drive is in standby mode or during shutdown. Such disc drives typically provide appropriate ramp structures closely adjacent the outer diameter of the discs. Since there is no contact between the heads and discs, the start torque requirement of the spindle motor is greatly reduced, simplifying overall disc drive design. However, the actuator locking system used to maintain the heads at their park position in such drives typically must be designed to provide a more complex set of characteristics.

Firstly, since there is no contact between the heads and discs, the locking system must provide all of the resistance to actuator movement in response to applied mechanical shocks when the disc drive is unpowered. This implies a high locking force.

However, since servo control of the actuator is not possible until cooperative engagement of the heads and discs has been reachieved, the locking system of disc drives incorporating head ramp structures must allow slow disengagement of the actuator from the locking system in order to not cause head/disc contact as the heads are moved off the ramps onto the spinning discs. Such a requirement implies a low amount or complete release of locking force, at least at such time as restoration of the operative head/disc interface is being accomplished.

The present invention provides both a high locking force in the absence of disc drive power and a release of this high locking force when associated power detection circuitry has determined that it is safe to reestablish the heads in operable relationship to the discs.

Figure 2:
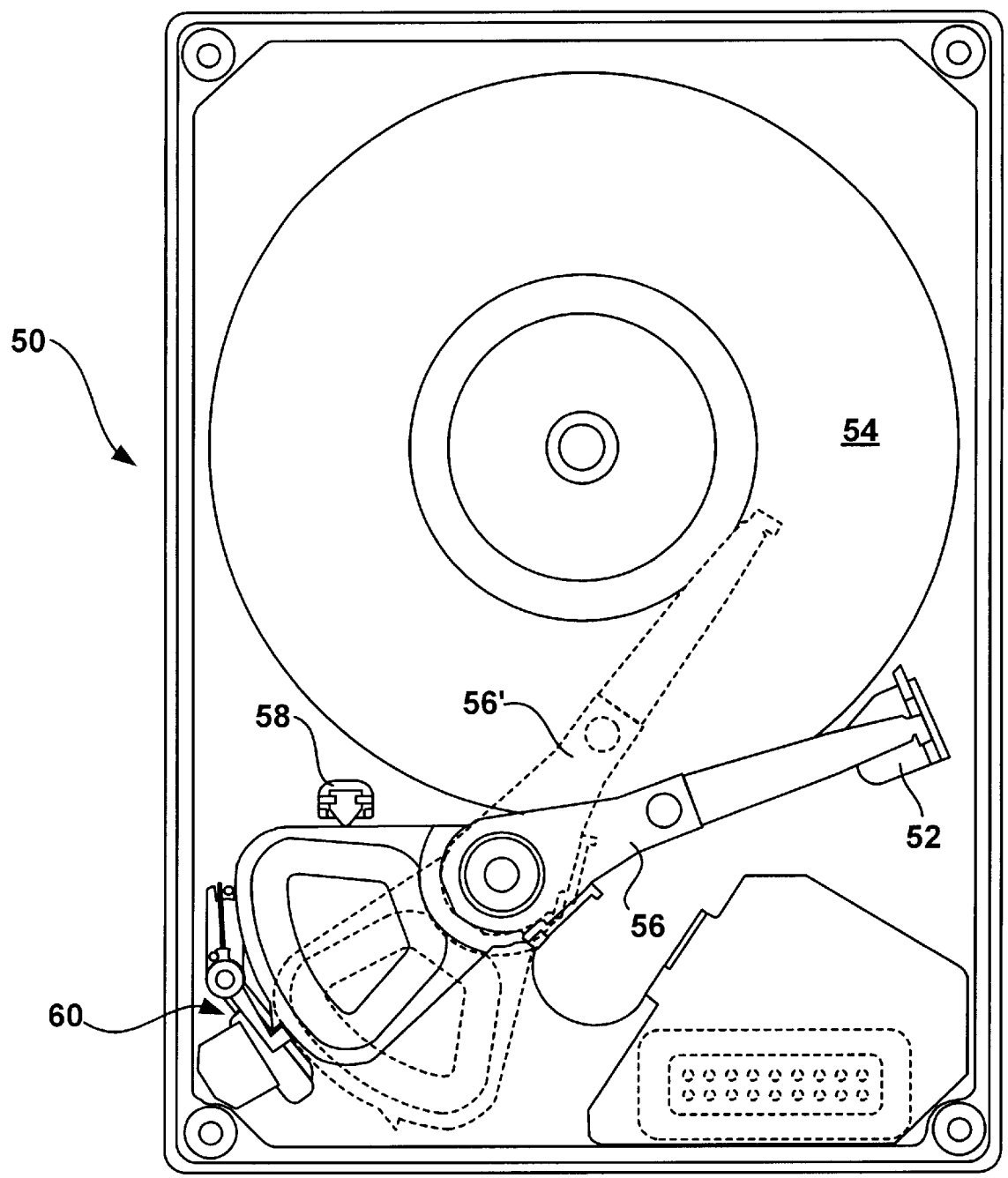
FIG. 2 is a partial top plan view of a disc drive incorporating the locking system of the present invention, showing the relative position of the elements of the locking system and the disc drive.

FIG. 2 is a plan view of a disc drive 50 incorporating the actuator locking system of the present invention. The disc drive 50 is of the type which parks the heads supported on ramp structures, shown generally at 52, closely adjacent to the outer diameter of the discs 54. However, as the locking system of the present invention is explained in detail below, it will become apparent that the locking system of the present invention can also be incorporated in disc drives which park the heads in contact with the innermost portion of the discs, such as the disc drive 2 of FIG. 1. Therefore, the scope of the present invention should not be considered as being limited by the location of the park position relative to the discs.

FIG. 2 shows the actuator body 56 in its parked or most clockwise position, with the opposite end of the range of free motion of the actuator illustrated by ghost or dashed lines generally at 56'. In the park position, the actuator is captured and locked by contact between the actuator and an outer limit stop assembly 58 and a lock actuator mechanism, shown generally at 60. Before a description of the operation of the locking system of the present invention is undertaken, a detailed description of the various elements of the outer limit stop assembly 58 and lock actuator mechanism 60 will be provided.

Figures 1, 3:
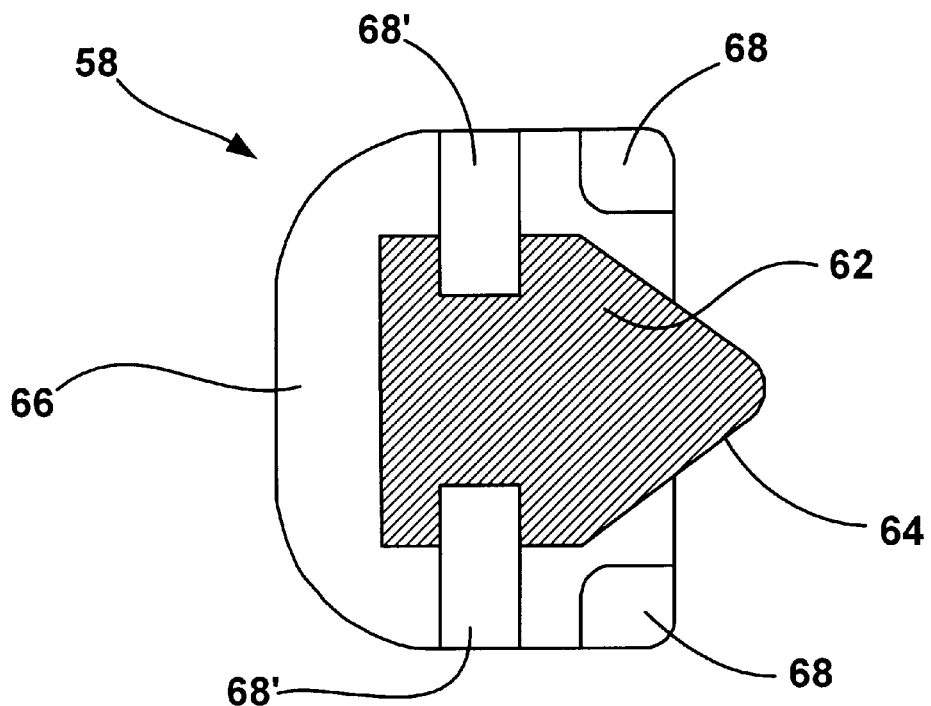
Figures 2, 3:
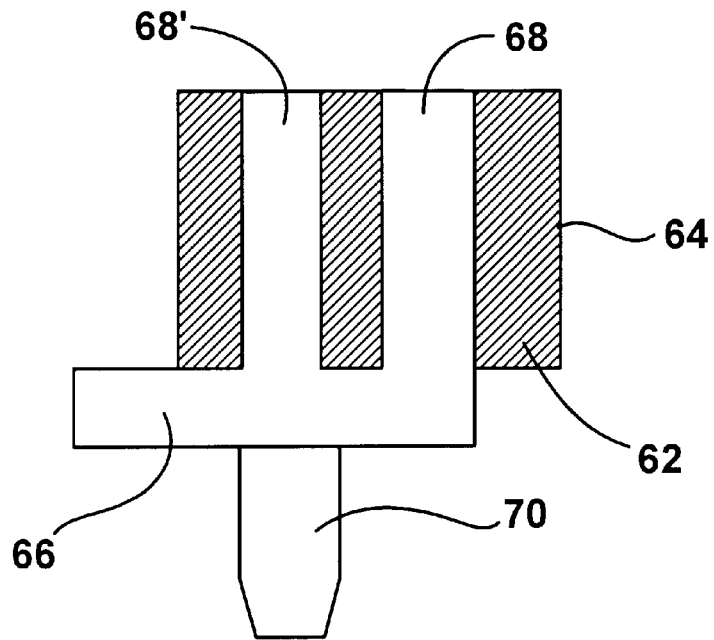

FIGS. 3-1 and 3-2 are plan and elevation views, respectively, of the outer limit stop assembly 58 which forms a portion of the locking system of the present invention. The outer limit stop assembly 58 includes a molded elastomeric contact member 62 which has a contact surface 64. It is presently envisioned that the contact member will be molded from Vamac® polyethylene acrylic elastomer, a product of E.I. Dupont de Nemours, of Wilmington, Delaware, which has a Shore A durometer hardness of 70 ±5. A person of skill in the art will appreciate, however, that the specific material of the contact member 62 would be selected on the basis of the moving mass of the actuator, the maximum linear velocity of the moving portion of the actuator at the point of contact with contact surface 64, and the amount of desired compliance in the limit stop assembly, and the specific material of the contact member 62 should not, therefore, be considered as limiting to the scope of the present invention.

The outer limit stop assembly 58 also consists of a limit stop support member 66 which mounts the contact member 62 and attaches the entire outer limit stop assembly 58 within the disc drive. The limit stop support member 66 is presently envisioned to be formed of 6061-T6 aluminum, but the scope of the present invention is envisioned to include other suitable materials, such as magnesium or any one of a number of polymers.

The limit stop support member 66 includes a pair of back fingers 68' which interact with appropriate mating features (not designated) on the contact member 62 to capture the elastomeric contact member 62 in an interference fit when the contact member 62 is inserted into the limit stop support member 66 from the top. A pair of front fingers 68 provide a hard stop for the actuator if for any reason the complete compliance of the contact member 62 is overcome.

The limit stop support member 66 also includes a mounting tab 70 which cooperates with an appropriately formed slot (not shown) in the base member or bottom pole of the actuator voice coil motor of the disc drive to position the entire outer limit stop assembly 58 in its intended position relative to the moving portion of the actuator. It is presently envisioned that the mounting tab 70 will be mounted to the disc drive base member by either an interference fit with the mounting feature on the disc drive base member, or by use of an appropriate adhesive. The role of the outer limit stop in the operation of the locking system of the present invention will be discussed in detail below.

The lock actuator mechanism, 60 in FIG. 2, consists of several elements, each of which will be described in turn below.

Figures 1, 4:
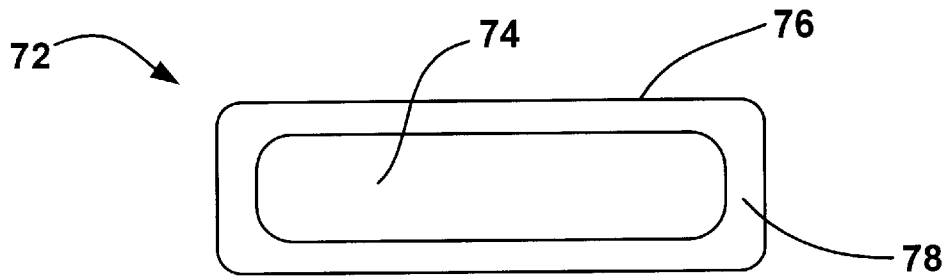
Figures 2, 4:
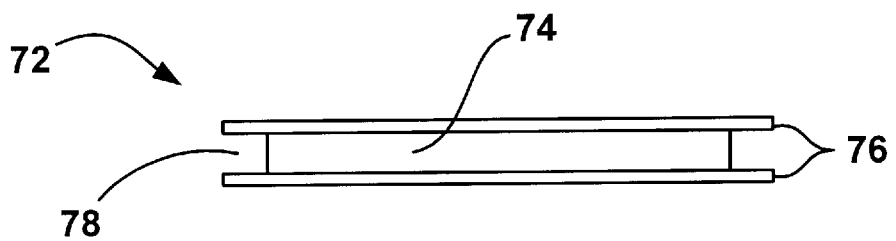

FIGS. 4-1 and 4-2 are plan and elevation views, respectively, of a coil bobbin 72 which forms a portion of the locking system of the present invention. The coil bobbin 72 is used to support multiple turns of wire to form a coil assembly which is an active portion of the actuator lock mechanism, as will be described below. The coil bobbin 72 includes a core portion 74 and upper and lower plate members 76. The plate members 76 extend beyond the core portion 74 and form a winding pocket 78 in which the wire forming the coil is wound. It is presently envisioned that the coil bobbin 72 be formed from a polymer, although a person of skill in the art will appreciate that other suitable materials could be used without exceeding the scope of the present invention.

Figure 5:
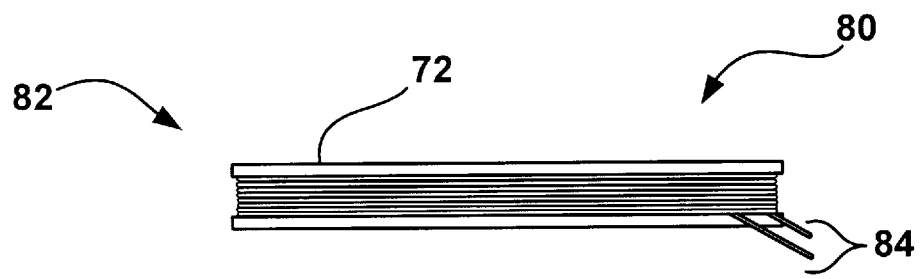
FIG. 5 is an elevation view of a coil assembly formed with the coil bobbin of FIGS. 4-1 and 4-2 which forms a portion of the locking system of the present invention.

FIG. 5 is an elevation view of a coil assembly 80 which includes the coil bobbin 72 of FIGS. 4-1 and 4-2. The coil assembly 80 also includes a coil 82 formed by multiple turns of magnet wire wound on the coil bobbin 72. The size of the wire and the specific number of turns used to form the coil 82 are a matter of design requirements, and various combinations of these variables have been found to be particularly useful in the present invention. For instance., the coil 82 can be formed of 48 turns of 38 gauge wire, 59 turns of 39 gauge wire, or 115 turns of 42 gauge wire. Other combinations of wire size and turn number are envisioned to fall within the scope of the present invention.

Furthermore, a person of skill in the art will also realize that a coil 82 can be formed without a supporting bobbin. Several effects of the incorporation of a "bobbinless" coil structure will be noted below.

The ends 84 of the coil wire are terminated to lead wires at solder pads, and power to energize the coil will be provided by lock control circuitry, which will also be described below.

Figure 6:
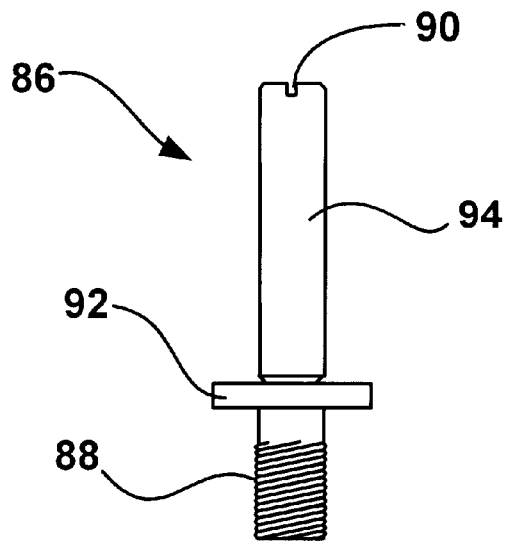
FIG. 6 is an elevation view of a pivot pin which forms a portion of the locking system of the present invention.

FIG. 6 is an elevation view of a pivot pin 86 which forms a portion of the locking system of the present invention. The pivot pin 86 includes a threaded end 88 which is intended for insertion in a corresponding tapped hole in the disc drive base member, and also includes a tooling feature 90 which is engaged by a cooperative mounting tool (not shown) to screw the threaded end 88 into the disc drive base member 4. In the example embodiment shown, the tooling feature 90 is a simple slot intended for use with a common flat-blade screwdriver, but other types of tooling features and mounting tools are envisioned as falling within the scope of the present invention. Similarly, the pivot pin 86 could include a plain mounting end and be press-fitted into an appropriately sized hole in the disc drive housing base member 4.

The pivot pin 86 also has a limit feature 92 which defines the maximum extent to which the pivot pin can be screwed into the disc drive base member, and a pivot shaft portion 94. Other elements of the locking system will be mounted for rotation over the shaft portion 94 in a manner to be described below, and the shaft portion is formed with an extremely smooth surface to minimize the friction with the components which will rotate on it.

Figure 7:
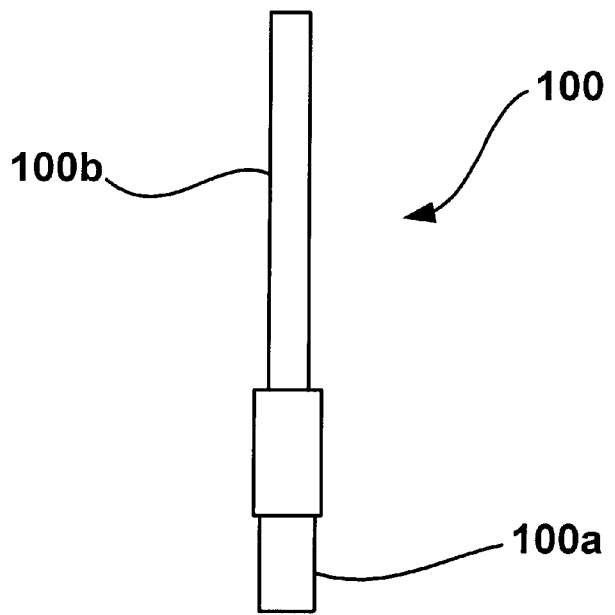
FIG. 7 is an elevation view of a limit pin which forms a portion of the locking system of the present invention.

FIG. 7 is an elevation view of a limit pin 100 which forms a portion of the locking system of the present invention. The limit pin 100 is formed preferably of series 300 stainless steel. The limit pin 100 includes a mounting end 100a, intended for engagement with a complementary feature in the housing base member (4 in FIG. 1). Various attachment schemes for the limit pin 100 are envisioned to fall within the scope of the present invention. For instance, the mounting end 100a can be threaded for engagement with a tapped hole in the housing base member, or can be pressed into an interference fit in a simple hole in the housing base member.

The limit pin 100 also includes a contact portion 100b. The function of the limit pin 100 as it relates to other elements of the locking system of the present invention will also be discussed below.

Figures 1, 8:
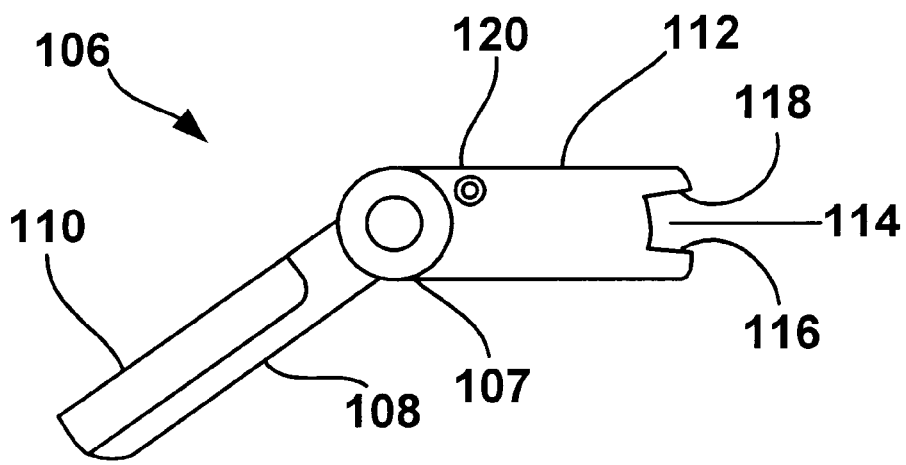
Figures 2, 8:
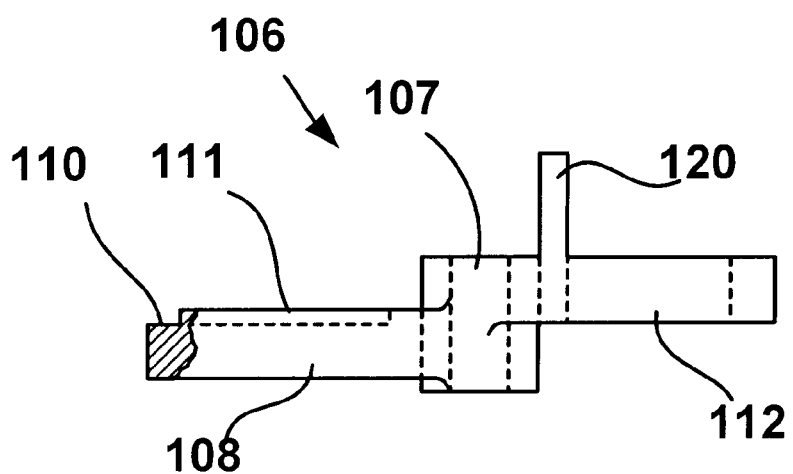

FIGS. 8-1 and 8-2 are plan and elevation views, respectively, of a coil support element 106 which forms a portion of the locking system of the present invention. The coil support element 106 includes a pivot opening 107 which is intended to be placed over the pivot pin 86 of FIG. 6, in a manner to be explained below. The coil support element 106 also includes a coil support arm 108 extending radially from the pivot opening 107. The coil support arm 108 further has a coil mounting surface 110 to which the coil assembly of FIG. 5 is intended to be mounted, preferably using an adhesive. As can be seen most clearly in FIG. 8-2, the coil mounting surface 110 is recessed slightly from the uppermost surface 111 of the coil support arm 108.

FIGS. 8-1 and 8-2 also show that the coil support element 106 includes a balance and limit arm 112, also extending radially from the pivot opening 107. The balance and limit arm 112 serves to balance the entire coil support element 106, and the attached coil assembly 80, about the pivot axis which is coincident with the central axis of the pivot opening 107. The balance and limit arm 112 also includes a notch 114 which forms lock and unlock contact surfaces 116, 118 respectively, which interact with the limit pin (100 in FIGS. 7-1 and 7-2) in a manner to be described below.

The balance and limit arm 112 also serves to mount an engagement pin 120. The function of the engagement pin 120 will also be discussed below.

It is presently envisioned that the major portion of the coil support element 106 will be formed from a polymer, with the engagement pin 120 formed of 303 stainless steel and press fitted into an appropriately sized opening (not designated) in the coil support element 106. However, any suitable materials which serve the functions describes below for these elements are envisioned to fall within the scope of the present invention.

Figures 1, 9:
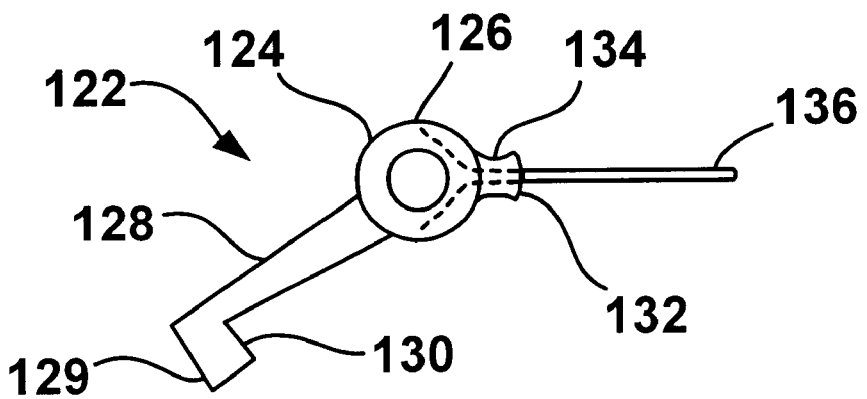
Figures 2, 9:
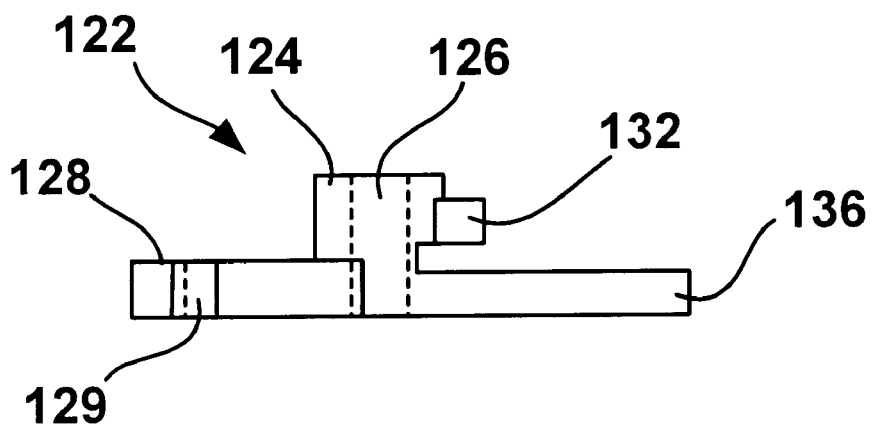

FIGS. 9-1 and 9-2 are plan and elevation views, respectively, of a lock pawl and bias spring element 122 which forms a portion of the locking system of the present invention. The lock pawl and bias spring element 122 includes a central body portion 124 which has a pivot opening 126. The pivot opening 126 is intended to mount over the pivot pin 86 of FIG. 6 in a manner to be described below.

The lock pawl and bias spring element 122 also includes a pawl arm 128 extending from the central body portion 124. The pawl arm 128 is formed at its distal end to create a lock pawl 129 which includes a pawl lock surface 130. The pawl lock surface 130 is the moveable locking surface that interacts with a corresponding feature on the moving portion of the actuator to lock the actuator in a manner which will be described below.

The lock pawl and bias spring element 122 further includes an engagement tab 132 which extends from the central body portion 124 and forms an engagement surface 134. The engagement surface 134 is intended for cooperative interaction with the engagement pin 120 on the coil support element 106 of FIGS. 8-1 and 8-2, in a manner which will be discussed below, to controllably rotate the lock pawl and bias spring element 122 about the pivot pin (86 in FIG. 6) to unlock the locking system of the present invention.

Finally, the lock pawl and bias spring element 122 includes a bias spring element 136 extending radially outward from the central body portion 124. The bias spring element 136 provides the bias force to encourage the pawl lock surface 130 into engagement with the corresponding locking surface on the moving portion of the actuator. To provide this bias force, the bias spring element 136 interacts with the limit pin 100 located on the support plate assembly 96 of FIGS. 7-1 and 7-2, all in a manner to be discussed below.

FIGS. 9-1 and 9-2 show a representative design whose balance about the pivot opening 126 can be controlled by appropriately selecting the extent of the engagement tab 132. That is, selection of the size, and therefore the mass, of the engagement tab 132 can be used to balance the entire latch pawl and bias spring element 122 about the pivot opening 126, without affecting the functions of the other elements of the latch pawl and bias spring element 122. The desirability of balancing the latch pawl and bias spring element 122 will be discussed in more detail below in the discussion of the operation of the locking system of the present invention in the presence of applied mechanical shocks.

It is currently envisioned that the lock pawl and bias spring element 122 will be fabricated from a polymer, but the scope of the invention should not be considered to be limited by specifics of material selection, as long as the material selected provides the functional characteristics which will be described below in the discussion of the operation of the locking system of the present invention.

Figures 1, 10:
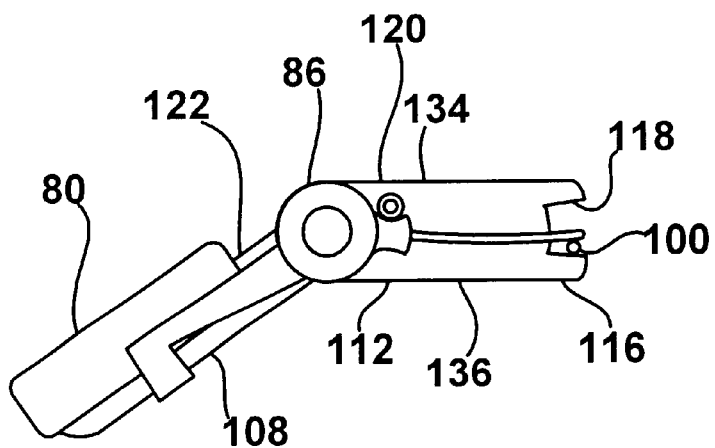
Figures 2, 10:
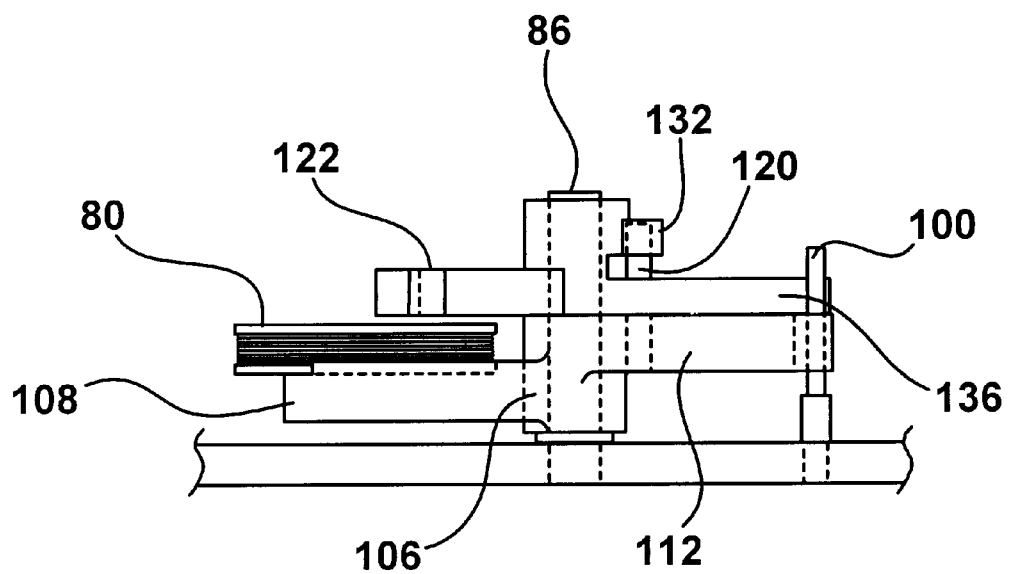

FIGS. 10-1 and 10-2 are plan and elevation views, respectively, of various components which form a portion of the locking system of the present invention, showing their assembled relationships. The figures show the pivot pin 86 of FIG. 6 and the limit pin 100, first described in the description of FIGS. 7-1 and 7-2. It will be recalled from previous discussion hereinabove that the pivot pin 86 and the limit pin 100 are fixedly engaged to the disc drive base member 4. Therefore, the pivot pin 86 and the limit pin 100 are fixed in relationship to each other, and the remaining components of the figures will be moved in relationship to these stationary elements, as will be described below.

In the figures, it can be seen that the coil support element (106 in FIGS. 8-1 and 8-2) has been mounted over the pivot shaft 86 and that the lock pawl and bias spring element (122 in FIGS. 9-1 and 9-2) is then placed over the pivot shaft 86 atop the coil support element. The coil assembly 80 of FIG. 5 is mounted to the coil mounting surface 110 of the coil support arm 108, preferably through the use of an anaerobic or cyanoacrylic adhesive or solvent bonder. When the coil support element 106 is properly positioned on the pivot shaft 86, limit pin 100 is located within the notch (114 in FIGS. 7-1 and 7-2) at the end of the balance and limit arm 112. Thus, the lock and unlock contact surfaces 116, 118 define the limits of counterclockwise and clockwise motion, respectively, of the coil support element 106.

Similarly, when the lock pawl and bias spring clement 122 is properly positioned on the pivot shaft 86, the engagement surface 134 of the engagement tab 132 is in contact with the engagement pin 120, and the distal end of the bias spring clement 136 is in contact with and slightly loaded against the limit pin 100. Therefore, the plan view of FIG. 10-1 shows the single stable position of the lock system elements, with the bias spring element 136 slightly loaded. Any tendency of the illustrated components to move in the clockwise direction will cause the bias spring element 136 to be further bent, and when the rotating force is removed, the components will return to the positions shown in FIG. 10-1. Thus the moving portion of the locking system of the present invention can be considered to be unistable, with the stable position of the rotating elements being the most counterclockwise position shown, as defined by the lock contact surface 116 and the limit pin 100. Similarly, it should be noted that the lock pawl and bias spring element 122 can be rotated clockwise independent of the coil support element 106, but that clockwise rotation of the coil support element 106 will force simultaneous rotation of the lock pawl and bias spring element 122 through contact between the engagement pin 120 on the coil support element 106 and the engagement surface 134 on the lock pawl and bias spring element 122. The conditions for rotating the moveable lock system components to their unlocked, or clockwise, position will be discussed below.

It is a significant aspect of the present invention that the elements of the locking mechanism associated with locking the actuator are principally located on one integral component (the lock pawl and bias spring element 122), while those elements principally concerned with unlocking the locking mechanism are on a separate component (the coil support element 106 of FIGS. 8-1 and 8-2). During locking of the actuator, frictional contact will be made between the lock pawl 129 and a portion of the moving actuator, as will be discussed below. This contact will cause the lock pawl and bias spring element 122 to pivot clockwise about the pivot shaft 86, applying stress to the bias spring element 136. By decoupling the mass of the lock pawl and bias spring element 122 from the mass of the coil support element 106 during this contact, the frictional force between the lock pawl 129 and the cooperative element on the moving portion of the actuator will be reduced, resulting in less wear at the point of contact than if the entire moving mechanism of FIGS. 10-1 and 10-2 were fabricated as a single unit. Additionally, less force from the movement of the actuator is required to rotate just the lock pawl and bias spring element 122 than would be required to also simultaneously rotate all masses associated with the coil support element 106.

Additionally, by decoupling the coil support element 106 from the lock pawl and bias spring element 122, any shock stresses caused by contact of the lock pawl 129 and the cooperative element on the moving portion of the actuator will not be directly passed to the coil 80, thus reducing the possibility of long-term degradation of the coil 80 due to such applied mechanical shocks.

FIGS. 11-1, 11-2 and 11-3 are plan, elevation and side views, respectively, of a magnetic circuit subassembly 140 which forms a portion of the locking system of the present invention. The magnetic circuit subassembly 140 consists of a substantially C-shaped back iron element 142 and a pair of permanent magnets 144 secured to the free ends of the back iron element 142, preferably through the use of an adhesive such as Locktite 430®, or other suitable adhesive.

The back iron element 142 and permanent magnets 144 are dimensioned such that, when assembled as shown in the figures, an air gap 146 is formed between the permanent magnets 144. This air gap 146 is dimensioned to cooperate with the coil assembly 80 of FIG. 5 to unlock the locking, system of the present invention in a manner to be discussed below.

The permanent magnets 144 are magnetized and mounted to the back iron element 142 such that the direction of magnetization is vertical. For instance, the permanent magnets 144 can be magnetized and mounted so that the north poles of the permanent magnets 144 are at the top of the magnets and the south poles of the permanent magnets 144 are at the bottom, as is shown by the N-S designations in FIG. 11-2. Alternatively the locations of the north and south poles of the permanent magnets 144 could be reversed. Proper operation of the locking system of the present invention requires only that the polarity of the permanent magnets 144 be coordinated with the direction of an unlocking current applied to the coil assembly 80, as will be discussed below.

Figures 1, 11:
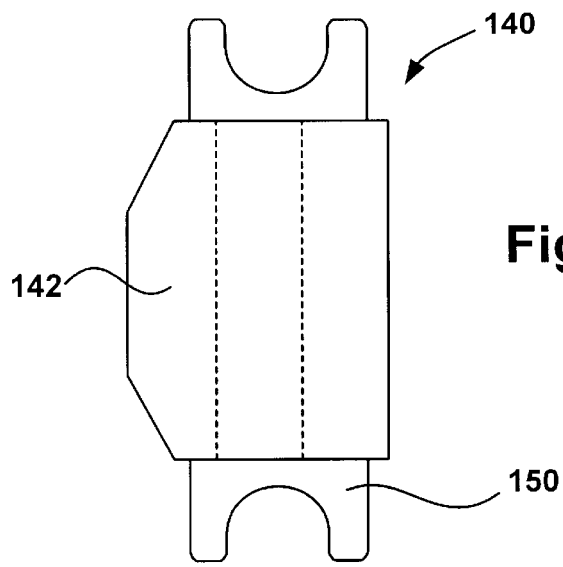
Figures 2, 11:
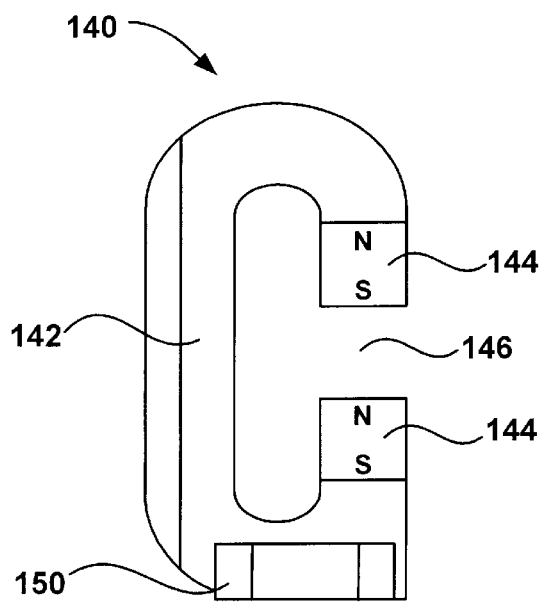
Figures 3, 11:
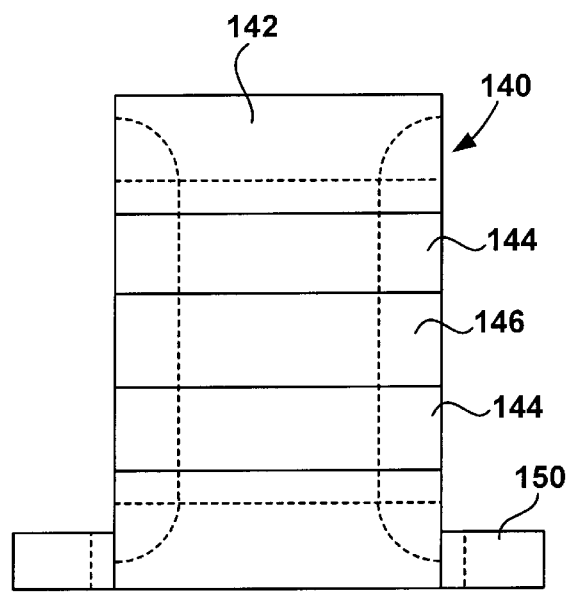

FIGS. 11-1 through 11-3 also show that the back iron element 142 is fabricated with mounting tabs 150. The mounting tabs are envisioned for use with cooperative machine screws (not shown) and tapped holes in the base member of the disc drive for attaching the entire magnetic circuit subassembly 140 in its desired position relative to the remainder of the locking mechanism. Alternative mounting mechanisms for the magnetic circuit subassembly 140, such as tapped holes in the lower surface of the back iron element into which screws passing through the base member of the disc drive housing are inserted, or adhesive mounting of the magnetic circuit subassembly to the disc drive housing base member, are all envisioned to fall within the scope of the present invention.

Figures 1, 12:
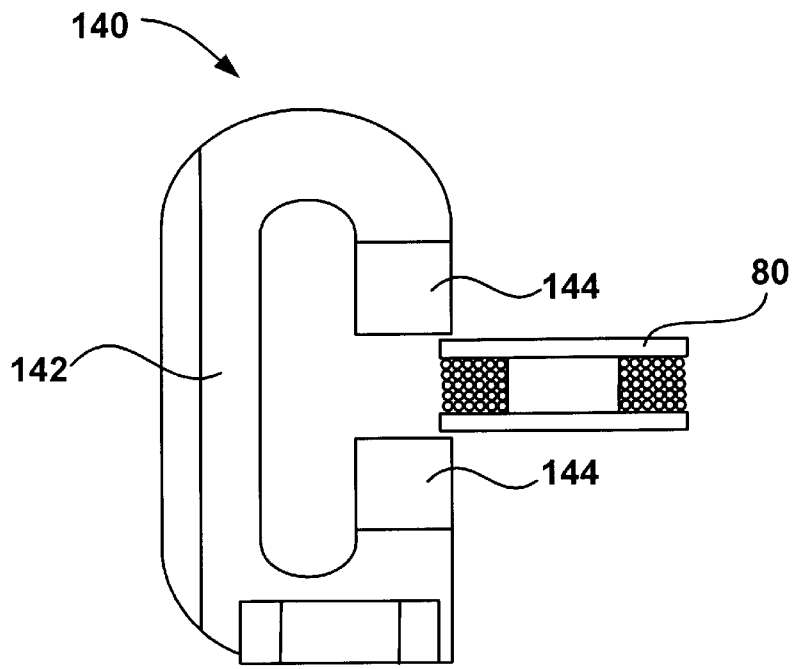
Figures 2, 12:
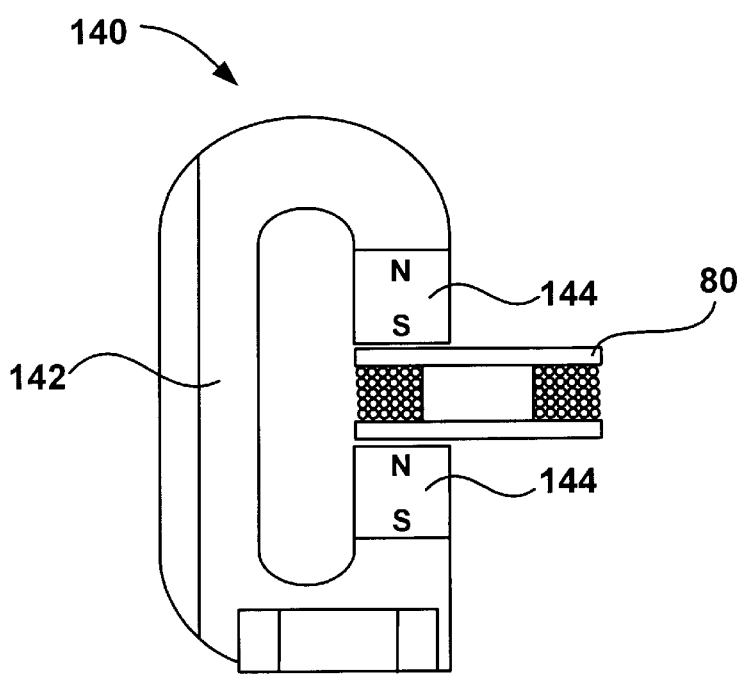

FIGS. 12-1 and 12-2 are diagrammatic elevation views of the magnetic circuit subassembly 140 of FIGS. 11-1 through 11-3 and the coil assembly 80 of FIG. 5 showing their relative positions when the moveable elements of the locking system of the present invention are in the locked and unlocked positions, respectively. Specifically, FIG. 12-1 shows that when the moveable elements of the locking system of the present invention are in the locked position, similar to the position shown for the lock elements in FIG. 10-1, the coil assembly 80 is supported by the coil support arm (108 in FIGS. 8-1, 8-2, 10-1 and 10-2) in a position which intrudes slightly into the air gap in the magnetic circuit subassembly 140. It will be recalled from the discussion of FIGS. 10-1 and 10-2 above that the moveable elements of the locking system are held in this locked position under normal quiescent conditions by the action of the bias spring element and limit pin (136 and 100, respectively, in FIGS. 10-1 and 10-2).

When unlocking current of the proper polarity is directed through the coil of the coil assembly 80, a magnetic field is generated surrounding the coil which interacts with the magnetic field of the permanent magnets 144 to move the coil assembly 80 further into the air gap in the magnetic circuit subassembly 140 to the position shown in FIG. 12-2. As the coil assembly 80 is moved to this unlocked position, the coil support element 106 and lock pawl and bias spring element 122 are rotated clockwise about the pivot pin 86 to their unlocked positions as well (refer to FIGS. 10-1 and 10-2).

It should be noted that if the coil assembly 80 were to be formed without a supporting bobbin (72 in FIGS. 4-1, 4-2 and 5), the spacing between the permanent magnets 144 and the coil 80 can be reduced. providing a corresponding increase in the power applied to movement of the coil 80 within the magnetic field of the magnetic circuit subassembly 140.

Figure 13:
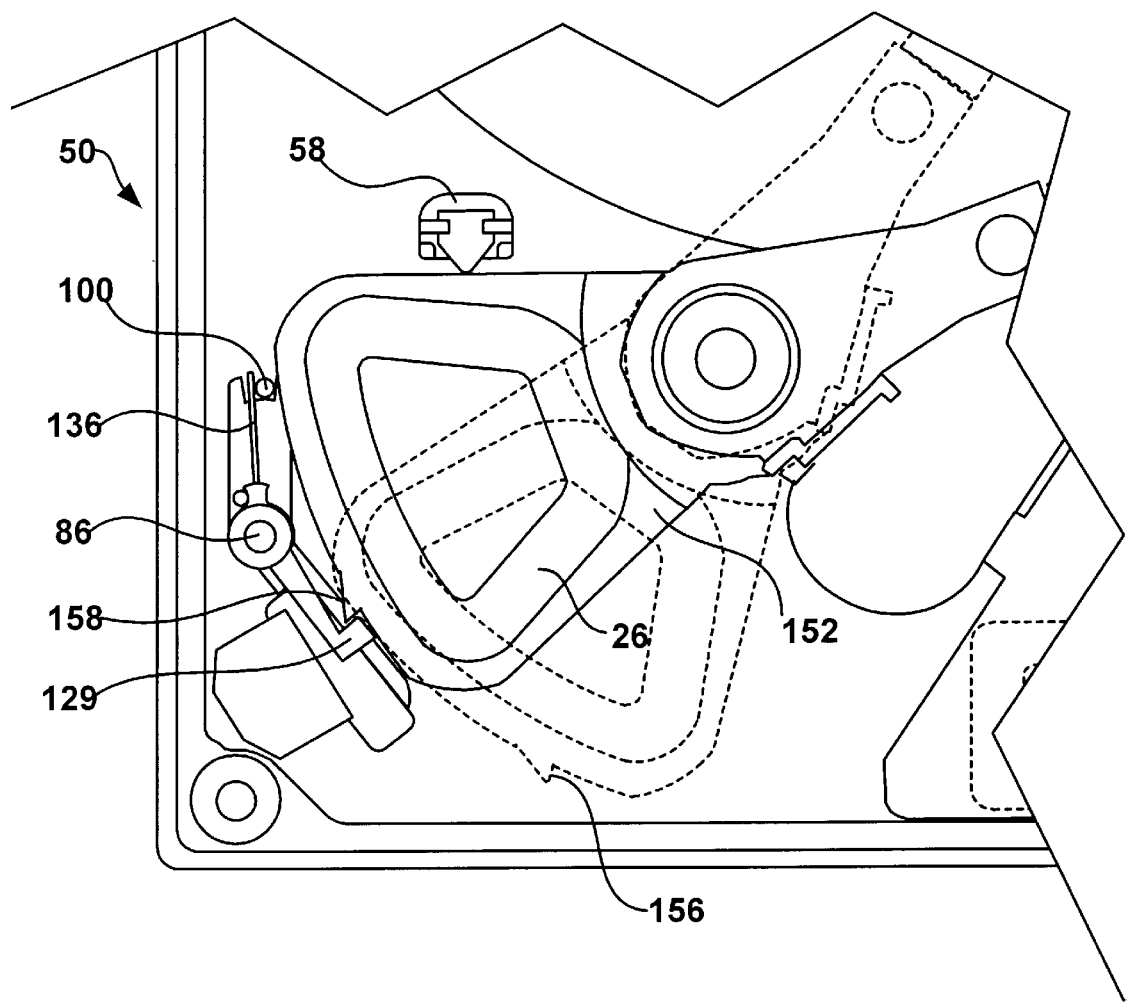
FIG. 13 is a detail plan view of the elements of the actuator locking system of the present invention in the locked position.

FIG. 13 is a detail partial plan view similar to FIG. 2 showing the elements of the actuator locking system of the present invention in the locked position. It will be recalled that the example embodiment of the figures assumes that the disc drive 50 is of the type which parks the actuator with the heads supported on ramp structures (52 in FIG. 2) closely adjacent the outer diameter of the discs 54, although this requirement is not a limitation of the scope of the present invention.

In the figure it can be seen that the actuator body includes a coil support element 152 that completely surrounds the coil 26 of the voice coil motor. On the radially outermost surface of the coil support element 152 is an actuator locking feature 154. The actuator locking feature 154 includes a locking surface 156 (designated on the "ghost" position of the actuator) and a ramp surface 158.

The following discussions of the locking and unlocking of the locking system of the present invention will be made with reference to FIG. 14, which is a simplified block diagram of example control circuitry within the disc drive used to control the locking system. It should be noted that the sequencing of events described below is related to the scope of the invention, while the specific hardware implementation used to achieve this sequencing is believed to lie within the normal level of skill of a qualified electronics engineer, given the mechanical makeup of the locking system of the present invention.

Locking of the actuator is accomplished either as a function of the disc drive native command set, in response to either a system user operation or a time dependent entry into standby mode, or as a response to a detected loss of disc drive power.

It will be understood by those of skill in the art that parking of the actuator and engagement of the locking system of the present invention can be initiated by a park command issued to the disc drive by the user. In such a case, unlocking of the actuator can be accomplished either by an appropriate unlock command or, if the park command is followed by a powering down of the system, in response to the restoration of power to the system as discussed above.

Power supplied to the disc drive is monitored by a power detect circuit 160, which outputs Power Off and Power On signals indicative of the state of input power. When a loss of power is detected in the disc drive, the Power Off signal is used in a spindle control circuit 162 to switch the spindle motor 10 from a driven mode to a generate mode. In the generate mode, the back EMF of the spinning spindle motor is used to generate a park signal on signal path 164. This park signal is gated through a multiplexer 166 also controlled by the spindle control circuit 162 on signal path 168, and applied to the coil 26 of the voice coil motor of the actuator. The park signal has a polarity, amplitude and duration selected to drive the actuator to the intended park position.

The park signal can also be generated in response to a user command or a timed entry into standby mode. Command set parking and locking of the actuator, whether user-initiated or as a result of entry into standby mode, causes a command to be received by the servo logic 172 on the command bus. Such commands are generated by a separate system microprocessor (not shown) which monitors the host interface and has overall control of disc drive internal operations, in manner well known in the industry. Since such actions occur while full power is available to the disc drive, the servo control logic 172 can direct the proper signals to the coil 26 of the actuator to cause it to move to the park position, and, through control circuitry common in the art, to remove power to the spindle motor 10 once the parking and locking of the actuator is completed.

In the example embodiment of FIG. 13, the park signal causes the actuator body to be rotated to its most clockwise position, as shown. As the actuator is rotating clockwise, a point is reached at which the ramp surface 158 of the locking feature 154 contacts the lock pawl 129. An examination of the figure reveals that this point of contact occurs before the actuator has achieved contact with the outer limit stop assembly 58. Therefore, clockwise rotation of the actuator continues and the configuration of the ramp surface 158 bears against the lock pawl 129, causing the lock pawl and bias spring element (122 in FIGS. 9-1 and 9-2) to be rotated clockwise about the pivot pin 86 bending and stressing the bias spring element 136 as it bears against the limit pin 100. Once the entire locking feature 154 has rotated past the lock pawl 129, the bias force built up in the bias spring element 136 rotates the lock pawl and bias spring element 122 back counterclockwise to its locked position, as shown in the figure. Simultaneously, a point on the coil support element 152 contacts and slightly compresses the outer limit stop assembly 58. The actuator is thus captured between the slightly compressed outer limit stop assembly 58 and contact between the locking surface 156 of the actuator and the pawl lock surface (130 in FIG. 9-1) on the lock pawl 129.

Figure 14:
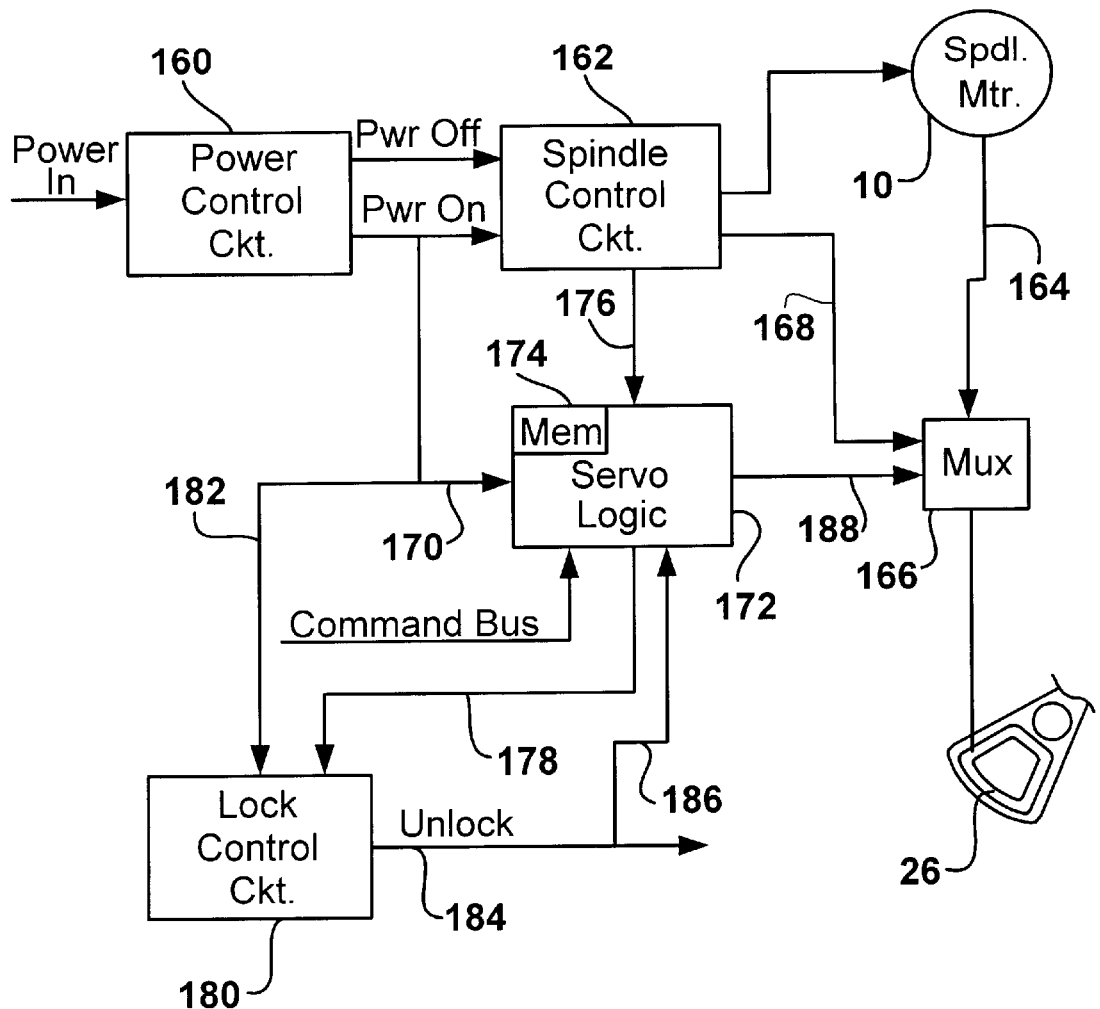
FIG. 14 is a simplified block diagram of circuitry in the disc drive used to monitor power applied to the disc drive and to control the spindle motor, actuator and locking system of the disc drive.

Returning now to the block diagram of FIG. 14, when the disc drive recovers from standby mode, a program run from the servo memory 174 causes the spindle motor to be accelerated to operational speed. A similar action occurs when power to the disc drive is restored. That is, the power detect circuit 160 generates the Power On signal, which is used by the spindle control circuit 162 to begin driving the spindle motor 10 and bringing the spindle motor 10 up to operational speed.

The Power On signal is also passed via signal path 170 to servo logic 172. Once again, a command on the command bus provides the same function when leaving standby mode. The servo logic 172 includes a servo microprocessor (not separately designated) that operates in response to a set of instructions stored in servo memory 174. The recovery from standby mode or restoration of power to the disc drive initiates a power on program that monitors the spindle control circuit via signal path 176. Once the spindle motor 10 has achieved operational speed, several actions are taken by the servo logic 172.

Firstly, the servo logic 172 provides a control signal via signal path 178 to a lock control circuit 180 to notify the lock control circuit that the spindle motor 10 is at operational speed, and that unlocking of the actuator is appropriate. The servo control circuit 180 also simultaneously drives the actuator in the clockwise direction, compressing the compliant contact member in the outer limit assembly 58, disengaging the locking surface (156 in FIG. 13) and the pawl lock surface (130 in FIG. 9-1) to allow for rotation of the lock mechanism components to the unlocked position. The lock control circuit 180 is also monitoring the input power on signal path 182 and the status of the microprogram running in the servo control logic. Once the lock control circuit 180 detects that power has been restored and that the spindle motor 10 is at operational speed, it generates an unlock signal on signal path 184, which is passed to the coil (82 in FIG. 5) of the lock mechanism. The effect of the unlock signal on the elements of the locking system will be discussed below.

The generation of the unlock signal also notifies the servo logic 172, via signal path 186, that unlocking of the actuator has been initiated. The servo logic 172, in response to the unlocking of the actuator, executes a head load program stored in servo memory 174. The head load program causes a series of control signals to be passed via signal path 188 to the multiplexer 166, and through the multiplexer 166 to the coil 26 of the actuator. The control signals cause the actuator to be moved from the park position to a position of cooperation with the discs in a manner well known in the art.

When the actuator has been moved from the park position, the servo logic 172 notifies the lock control circuit 180 via signal path 178, and the unlock signal is terminated. Once the actuator has been moved to a point where the heads are engaged with the disc surface, normal servo operations to control the actuator are initiated.

The effect of the circuitry of FIG. 14 on the elements of the locking system will now be discussed.

Figure 15:
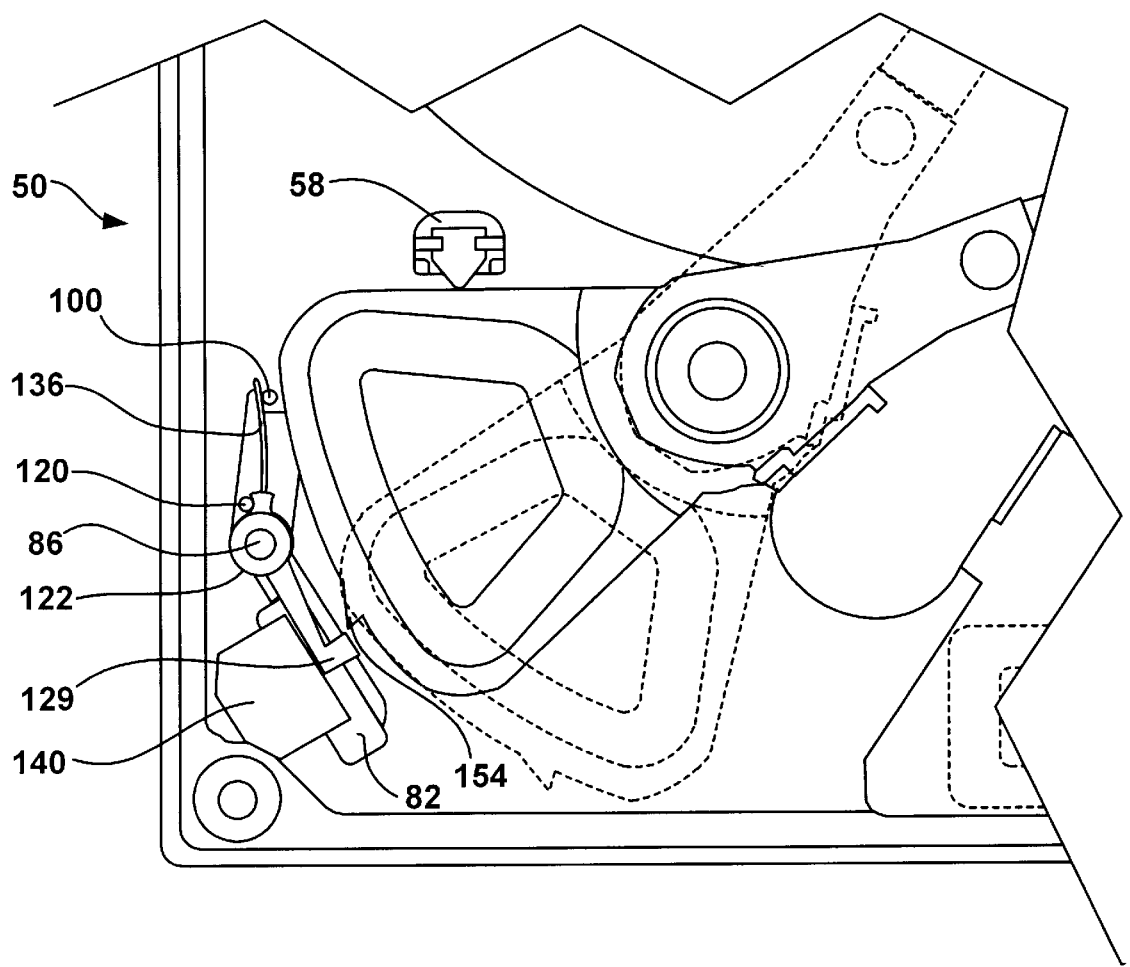
FIG. 15 is a detail plan view of the elements of the actuator locking system of the present invention in the unlocked position.

FIG. 15 is a detail view of a portion of a disc drive showing the operation of the locking system of the present invention during recovery from standby mode or power restoration. When the unlock signal is applied to the coil 82 of the locking system, the coil is drawn further into the magnetic circuit 140, as was discussed above in relationship to FIG. 12-2. As the coil 82 moves into the magnetic circuit 130, the coil support element (106 in FIGS. 8-1 and 8-2) is rotated clockwise about the pivot pin 86. The amount of rotation of the coil support element 106 is limited by contact between the unlock contact surface (118 in FIG. 8-1) and the limit pin 100.

When the coil support element 106 is rotated in response to the unlock signal, the engagement pin 120 bears against the engagement surface (134 in FIG. 9-1) on the lock pawl and bias spring element 122, causing the lock pawl and bias spring element 122 to rotate clockwise in turn. As the lock pawl and bias spring element 122 rotates clockwise, the lock pawl 129 is moved away from engagement with the locking feature 154, freeing the actuator for counterclockwise movement away from the park position against the outer limit assembly 58.

As discussed above in relationship to FIG. 14, the servo logic 172, in response to the unlock signal applied to the lock coil 82, provides the control signals used to move the actuator away from the park position and into cooperative engagement with the discs.

In FIG. 15 it can also be seen that the clockwise rotation of the lock pawl and bias spring element 122 in response to the unlock signal also causes the bias spring element 136 to be bent due to its contact with the limit pin 100. Once the actuator has been moved from the park position, the unlock signal is terminated, the bias spring element 136 straightens and the lock elements are allowed to rotate back counterclockwise to their lock position, ready to once again lock the actuator if another shutdown or return to standby mode occurs or if a power loss is detected.

Now that the operation of the locking system of the present invention has been described, the response of the locking system to mechanical shocks applied to the disc drive can be discussed.

Figure 16:
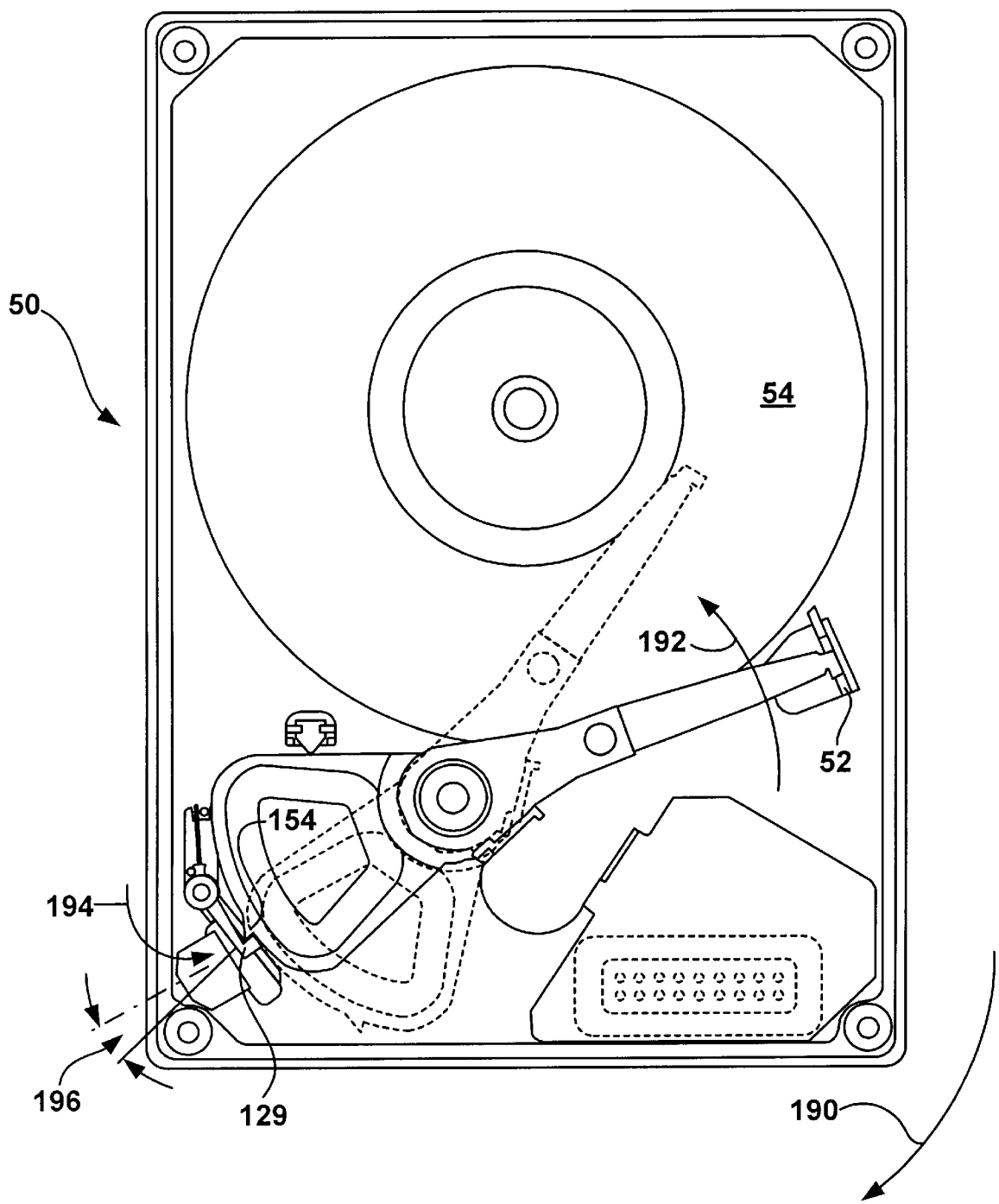
FIG. 16 is a plan view of a disc drive incorporating the locking system of the present invention illustrating the response of the locking system to rotary mechanical shocks applied to the disc drive in a first direction.

FIG. 16 is a plan view of a disc drive 50 incorporating the locking system of the present invention and shows the effect of a rotational mechanical shock applied to the disc drive 50 in a clockwise direction, as indicated by arrow 190. Inertial forces exerted on the actuator and locking mechanism tend to thus be in the counterclockwise direction, as indicated by arrows 192 and 194, respectively. The counterclockwise force exerted on the actuator body is in the direction which tends to move the heads off the ramp structures 52 and onto the discs 54. However, the counterclockwise force exerted on the locking mechanism is in the direction that tends to keep the lock pawl 129 engaged with the locking feature 154 on the actuator. This is because the pivot axis of the rotating components of the locking mechanism is located clockwise from the contact surfaces of the locking mechanism in relationship to the pivot axis of the actuator, thus ensuring that applied mechanical shock will always tend to rotate the rotating elements of the locking mechanism in the same direction as they tend to rotate the actuator.

Furthermore, the pawl lock surface (130 in FIG. 9-1) and the locking surface (156 in FIG. 13) of the locking feature 154 meet in a common plane which lies at an angle counterclockwise from a line drawn through the point of contact and the pivot axis of the actuator, as shown by the angle generally identified at 196 in FIG. 16. The angle 196 is large enough so that the line of action of any force acting at an angle normal to the plane of the mating, surfaces will lie outside the locking mechanism pivot axis (away from the actuator pivot axis), creating a counterclockwise restraining force on the locking mechanism, making it self-energizing, which in turn resists unlocking of the actuator. This angle 196 is hereinafter referred to as the "locking angle" 196. This self energizing aspect of the lock mechanism of the present invention leads to the necessity of driving the actuator in a clockwise direction to enable disengagement of the lock mechanism, as was described above in the description of the unlocking sequence of events.

It should be noted here that, in a particular 2.5" disc drive, an optimum locking angle 196 was found to be approximately 11.2 degrees. The actual optimum locking angle 196 for a particular disc drive implementation of the present invention would be dependent on several factors, including the form factor of the disc drive, available space for the latching mechanism within the disc drive housing, and other geometric relationships between disc drive components. Therefore, the scope of the present invention should not be considered as being limited to a particular locking angle 196.

Figure 17:
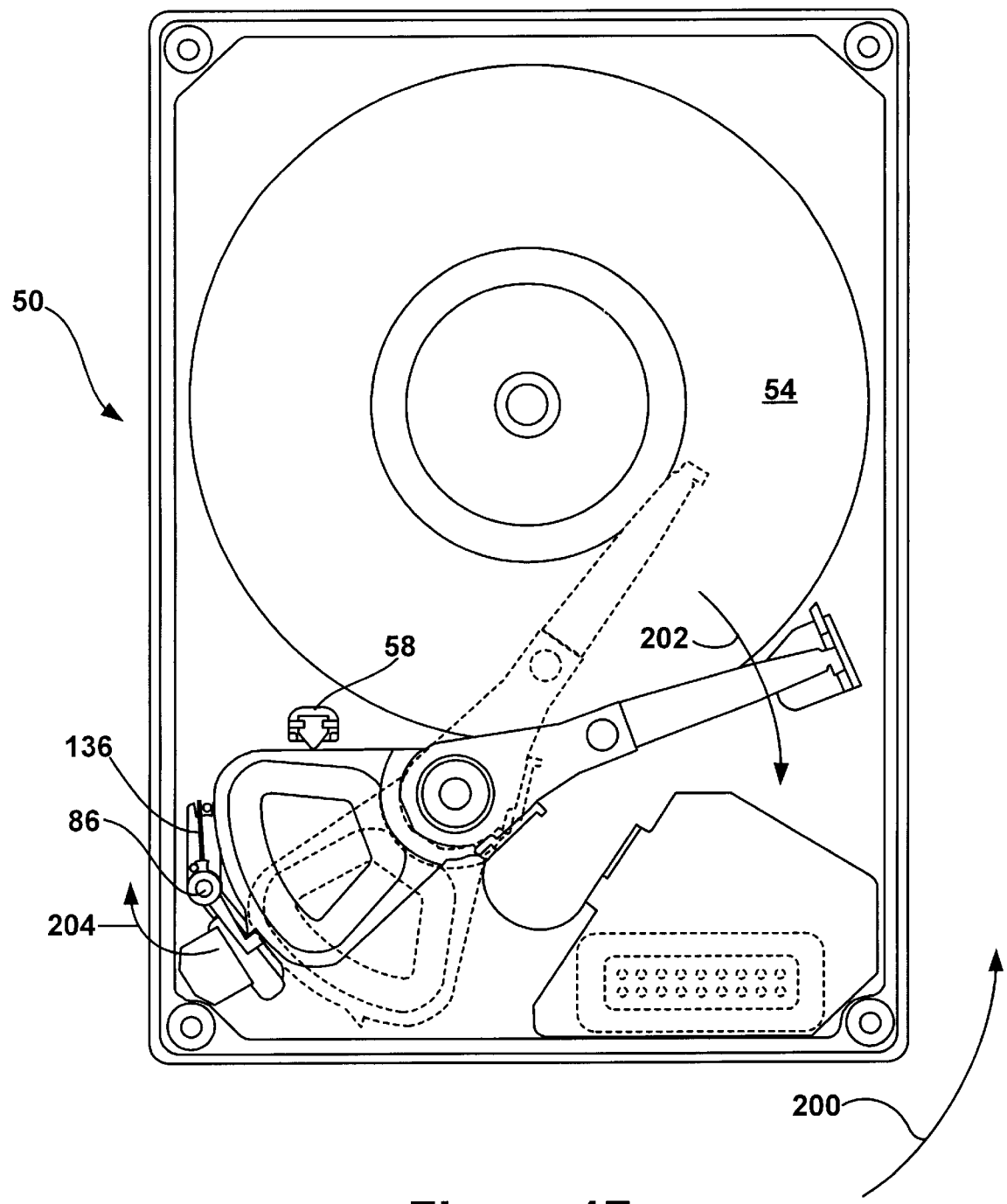
FIG. 17 is a plan view of a disc drive incorporating the locking system of the present invention illustrating the response of the locking system to rotary mechanical shocks applied to the disc drive in a second direction.

FIG. 17 is a plan view similar to FIG. 16, but showing the effect of rotational mechanical shocks applied to the disc drive 50 in a counterclockwise direction, as indicated by arrow 200. In the case of counterclockwise mechanical shock applied to the disc drive 50, inertial forces tend to rotate the actuator and locking mechanism in a clockwise direction, as shown by arrows 202 and 204, respectively.

The exertion of clockwise force on the locking mechanism tends to rotate the locking mechanism to its unlocked position. However, the inertial forces on the locking mechanism are small due to the fact that the rotating components are relatively small and fabricated from low-mass materials. Furthermore, any tendency of the locking mechanism to rotate clockwise is countered by the bias spring element 136, tending to keep the locking system engaged.

It should also be noted that clockwise rotation of the actuator tends to encourage the actuator into closer engagement with the outer limit stop 58, again maintaining the actuator in the locked position.

Figure 18:
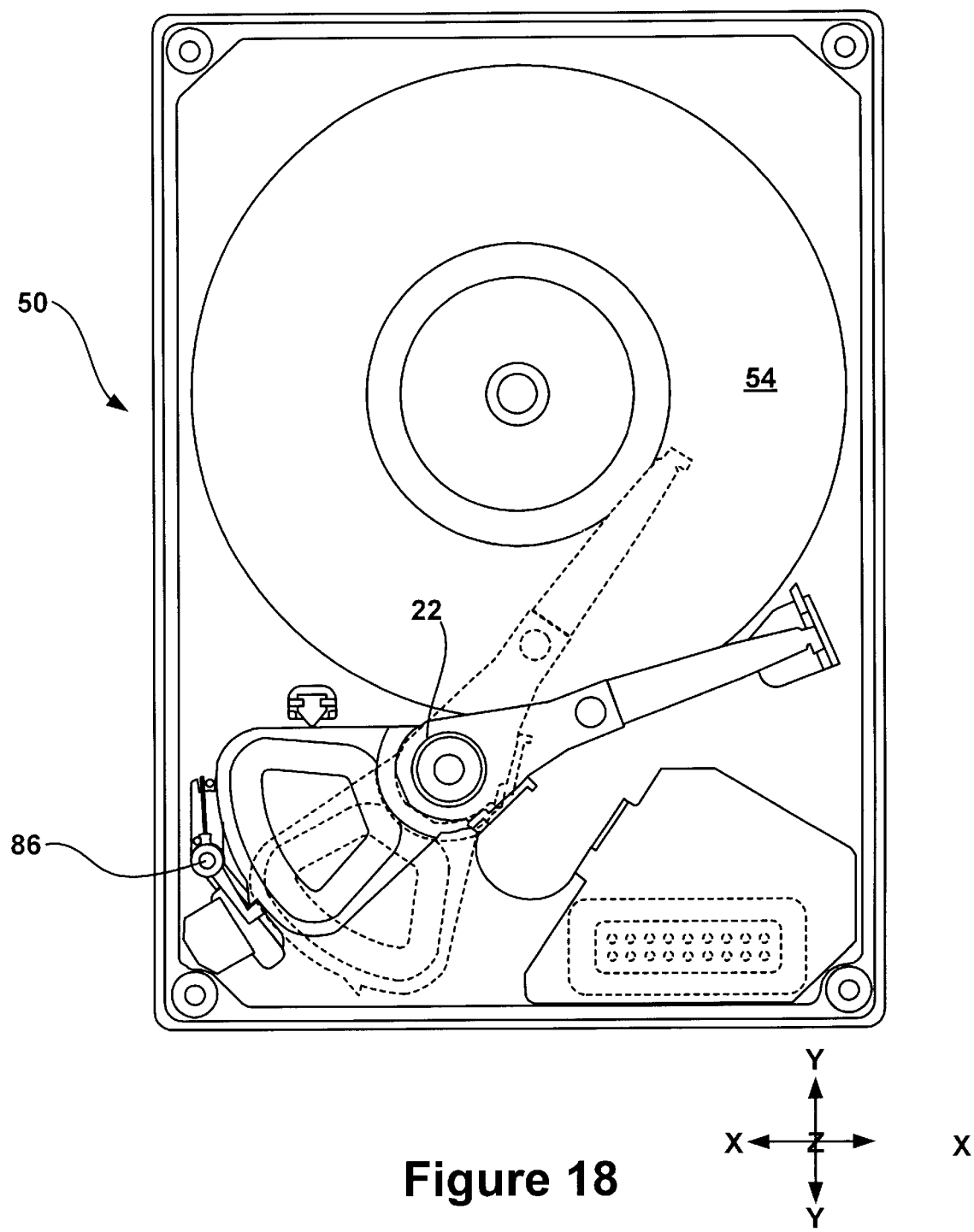
FIG. 18 is a plan view of a disc drive incorporating the locking system of the present invention illustrating the response of the locking system to translational mechanical shocks applied to the disc drive.

Finally, FIG. 18 is a plan view, similar to FIGS. 16 and 17, showing the response of the disc drive 50 to translational applied mechanical shocks. Translational shocks are defined as linear shocks applied to the disc drive 50 in any of the three orthogonal axes, and the orthogonal axes are defined in the lower right corner of the figure. The X axis corresponds to the horizontal direction in the figure, the Y axis corresponds to the vertical direction in the figure, and the Z axis corresponds to the direction into and out of the paper.

As will be apparent to one of skill in the art, translational shocks applied in the Z axis will have no tendency to rotate the actuator or locking components, and therefore will have no effect on the locking system.

Both the actuator and the locking mechanism are substantially balanced about their respective pivot shafts 22, 86. Because of this balancing, there is substantially no inertial force exerted on the actuator or locking mechanism by the application of translational shocks in either the X or Y axes.

Certain minor modifications of the structure of the elements of the locking system of the present invention can be made without departing from the spirit of the invention. For instance, the major functional components of the coil support element 106 of FIGS. 8-1 and 8-2 and of the lock pawl and bias spring element 122 of FIGS. 9-1 and 9-2 could be integrally molded in the same part, eliminating the need for the engagement pin (120 in FIGS. 8-1 and 8-2) and the cooperative engagement surface (134 in FIG. 9-1 and 9-2) if proper engineering consideration of the added mass of the single component during locking operations, and accompanying wear at the contacting elements, is performed. Likewise, the effect of mechanical shocks, generated by the contact between the lock pawl and the cooperative feature on the moving portion of the actuator, on the coil must be considered. Similarly, the bias spring element (136 in FIGS. 9-1 and 9-2) could be fabricated from spring steel and then integrally molded with related functional elements.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiment, certain variations and modifications may be suggested to one of skill in the art upon reading this disclosure. Therefore, the scope of the present invention should be considered to be limited only by the following claims.

What is claimed is:

1. An apparatus comprising:

an actuator configured to move within a range of positions between a defined park position and an opposite position;

a lock member configured to move within a range of positions between a first position and a second position, the lock member capturing the actuator when the lock member is in the first position and the actuator is in the defined park position; and an unlock lever separate from the lock member, the unlock lever capable of engaging the lock member during unlocking operations to urge the lock member away from the first position enough to release the actuator, the unlock lever being affixed to a coil, the apparatus further comprising a fixedly mounted magnetic circuit arranged to attract the coil when an unlocking current is directed through the coil.

2. A disc drive including a rotary actuator, pivotable about an actuator pivot shaft fixedly mounted to a housing of the disc drive, the actuator having defined inner and outer limits of range of motion, the disc drive further including a locking system for maintaining the actuator at a defined park position coincident with one of the limits of range of motion, the locking system comprising:

a limit stop assembly fixedly mounted to the disc drive housing in the path of motion of the actuator;

an actuator locking feature integral to and movable with the actuator, the actuator locking feature including a ramp surface and a lock surface;

a rotatable pawl arm, the pawl arm comprising a lock pawl, the lock pawl including a pawl lock surface;

a unistable locking mechanism, rotatable in a lock direction and an unlock direction, the locking mechanism locking the actuator between the pawl lock surface and the limit stop assembly during locking operations;

a bias spring for generating a locking force for encouraging the locking mechanism to its stable, locked position; and unlocking means for rotating the locking mechanism against the locking force of the bias spring to release the actuator from its captive position, the mass of the unlocking means uncoupled from the mass of the locking mechanism during locking operations.

3. A disc drive as claimed in claim 2, further including coupling means for coupling the first rotating lock member to the second rotating lock member during unlocking operations.

4. A disc drive as claimed in claim 2 in which the unlocking means comprises:

a magnetic circuit fixedly mounted relative to the disc drive housing; and a coil rotatably mounted relative to the disc drive housing, arranged to interact with and rotate toward the magnetic circuit when an unlocking current is directed through the coil.

5. A disc drive as claimed in claim 2 wherein the lock surface of the actuator locking feature and the pawl lock surface engage in a common plane which lies at a locking angle from a line drawn through the lock surface of the actuator locking feature and through an axis of rotation of the actuator about the actuator pivot shaft.

6. A disc drive as claimed in claim 2 wherein a line of force normal to the common plane extends radially outward of a central axis of the lock pivot shaft relative to the actuator pivot shaft.

7. An apparatus, comprising:

an actuator configured to move within a range of positions between a defined park position and an opposite position, the actuator further comprising a lock surface;

a lock member configured to move within a range of positions between a first position and a second position, the lock member capturing the actuator when the lock member is in the first position and the actuator is in the defined park position, the lock member further comprising a pawl lock surface which contacts the actuator lock surface at a locking angle when the lock member is in the first position, the locking angle resisting disengagement of the lock member from the actuator; and an unlock lever separate from the lock member, the unlock lever capable of engaging the lock member during unlocking operations to urge the lock member away from the first position enough to release the actuator.

8. An apparatus as claimed in claim 7 in which the locking angle is approximately 11.2 degrees.

9. An apparatus as claimed in claim 7 in which the lock member comprises a bias element urging the lock member toward the first position.

* * * * *